(12) United States Patent
Falk et al.

(10) Patent No.: US 9,426,870 B2
(45) Date of Patent: Aug. 23, 2016

(54) GENERATOR FOR A FLASH DEVICE AND A METHOD IN A GENERATOR FOR A FLASH DEVICE

(71) Applicant: PROFOTO AB, Syndbyberg (SE)

(72) Inventors: Anton Falk, Huddinge (SE); Ulf Carlsson, Täby (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 14/426,640

(22) PCT Filed: Sep. 6, 2013

(86) PCT No.: PCT/SE2013/051038
§ 371 (c)(1),
(2) Date: Mar. 6, 2015

(87) PCT Pub. No.: WO2014/039000
PCT Pub. Date: Mar. 13, 2014

(65) Prior Publication Data
US 2015/0245453 A1    Aug. 27, 2015

(30) Foreign Application Priority Data

Sep. 6, 2012 (SE) ...................................... 1251001

(51) Int. Cl.
*H05B 41/30* (2006.01)
*H05B 41/32* (2006.01)
*G03B 15/05* (2006.01)

(52) U.S. Cl.
CPC ............... *H05B 41/30* (2013.01); *G03B 15/05* (2013.01); *H05B 41/32* (2013.01); *G03B 2215/05* (2013.01)

(58) Field of Classification Search
CPC ........ H05B 41/30; H05B 41/32; H05B 41/00; G03B 15/05; H03K 3/53

USPC .......................................................... 315/224
See application file for complete search history.

(56) References Cited

U.S. PATENT DOCUMENTS 3,725,734 A    4/1973    Schneider
4,071,808 A    1/1978    Zentmyer
(Continued)

FOREIGN PATENT DOCUMENTS

DE    1168563 B    4/1964
DE    1288682 B    2/1969
(Continued)

OTHER PUBLICATIONS

Office Action dated Apr. 30, 2013 in Swedish application No. 1251001-2.
(Continued)

*Primary Examiner* — Dylan White
(74) *Attorney, Agent, or Firm* — Knobbe, Martens, Olson & Bear

(57) ABSTRACT

A generator for a flash device includes at least a first capacitor bank, which includes at least one capacitor of a first type and at least a second capacitor bank, which includes at least one capacitor of a second type. The first capacitor bank is connectable to a charger via a first switch and the second capacitor bank is connectable to a charger via a second switch. The generator is configured to individually control the first switch and the second switch so that the first capacitor bank and the second capacitor bank can be individually charged to the same or different voltages. Since the first capacitor bank and the second capacitor bank can be simultaneously discharged, it is possible to achieve a desired energy level and color temperature from a flash device connected to the generator.

13 Claims, 4 Drawing Sheets

(56) References Cited

U.S. PATENT DOCUMENTS

| | | | | |
|---|---|---|---|---|
| 4,130,780 A | * | 12/1978 | Ban | H05B 41/32 |
| | | | | 315/241 P |
| 4,613,797 A | * | 9/1986 | Eggers | H05B 41/34 |
| | | | | 315/230 |
| 4,656,397 A | | 4/1987 | Chappell et al. | |
| 4,853,600 A | | 8/1989 | Zeltner et al. | |
| 4,900,990 A | | 2/1990 | Sikora | |
| 6,044,227 A | * | 3/2000 | Hata | G03B 7/16 |
| | | | | 396/202 |
| 6,339,679 B1 | * | 1/2002 | Aratame | G03B 15/05 |
| | | | | 396/176 |
| 2007/0262728 A1 | | 11/2007 | Savage et al. | |
| 2008/0211420 A1 | * | 9/2008 | Walker | H05B 41/34 |
| | | | | 315/238 |
| 2009/0261788 A1 | | 10/2009 | Motoyama | |
| 2012/0112658 A1 | * | 5/2012 | Hauser | H05B 41/325 |
| | | | | 315/294 |
| 2013/0230305 A1 | * | 9/2013 | Falk | G01J 3/505 |
| | | | | 396/164 |
| 2014/0327426 A1 | * | 11/2014 | Shterzer | H03K 3/35 |
| | | | | 323/364 |

FOREIGN PATENT DOCUMENTS

| | | |
|---|---|---|
| SE | 535271 C2 | 6/2012 |
| WO | 2012/011863 A1 | 1/2012 |

OTHER PUBLICATIONS

Written Onion of the International Searching Authority mailed Feb. 12, 2014 in corresponding International Application No. PCT/SE2013/051038.

Extended European Search Report issued May 11, 2016 in corresponding application No. 13835555.

\* cited by examiner

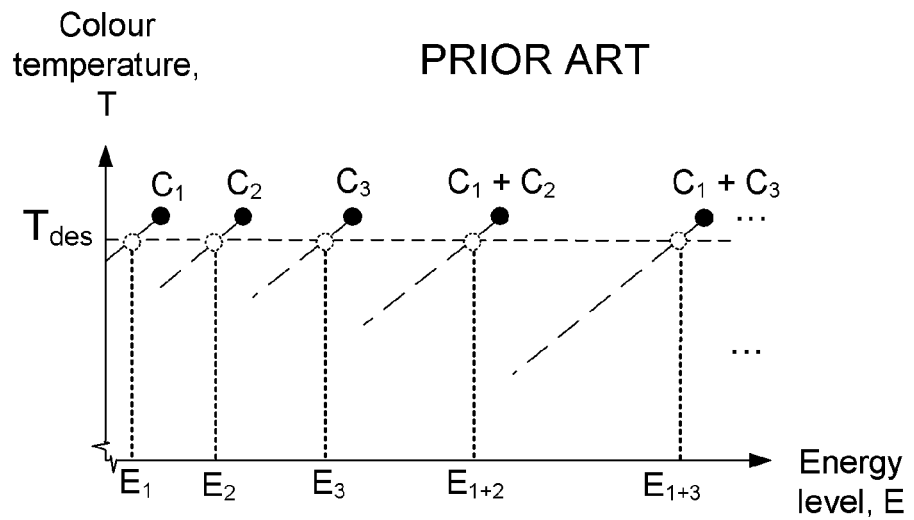
Fig. 2A
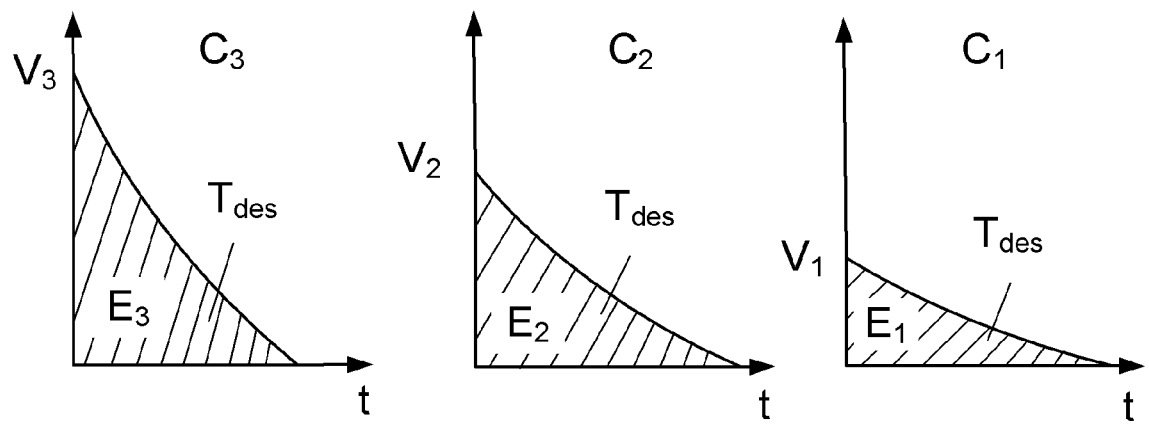
PRIOR ART  Fig. 2B

GENERATOR FOR A FLASH DEVICE AND A METHOD IN A GENERATOR FOR A FLASH DEVICE

CROSS-REFERENCE TO RELATED APPLICATIONS

This application is the U.S. National Phase under 35. U.S.C. §371 of International Application PCT/SE2013/051038, filed Sep. 6, 2013, which claims priority to Swedish Patent Application No. 1251001-2, filed Sep. 6, 2012. The disclosures of the above-described applications are hereby incorporated by reference in their entirety.

TECHNICAL FIELD

The invention relates in general to a generator for a flash device. The invention also relates to a method in a generator for a flash device

BACKGROUND

Generally, in flash generators, it is desirable to control the amount of energy provided to a flash device connected to the flash generator as well as the color temperature of the resulting emitted light from the flash device.

A flash generator typically comprises at capacitor C configured to feed energy to a flash device for a flash. The flash device discharge by igniting ignition circuits inside the flash device and thus drains the capacitor C. A first method of controlling the amount of energy provided to a flash device and the color temperature of the emitted light from the flash device is illustrated in FIGS. 1A-1B. In FIG. 1A, by charging the capacitor C up to a particular charging voltage, an amount of energy corresponding to the energy level $E_C$ is stored in the capacitor C. When said amount of energy $E_C$ is provided to the flash device, the resulting emitted light from the flash device will have the desired color temperature $T_{des}$. If the capacitor C is instead charged up to a lower charging voltage, a lower amount of energy corresponding to the energy level $E_{des}$ is stored in the capacitor C. Thus, when said lower amount of energy $E_{des}$ is provided to the flash device, the resulting emitted light from the flash device will instead have the color temperature $T_B$. However, it may often be desirable to achieve the desired color temperature $T_{des}$ of the resulting emitted light from the flash device, but while only providing the amount of energy $E_{des}$ to the flash device.

In FIG. 1B, the capacitor C is charged to a particular charging voltage V corresponding to an amount of energy $E_{des}$+E'. As the amount of energy in the capacitor C is drained by the flash device, the discharge of energy is interrupted at time $t_1$ when the amount of already discharged energy by the flash device corresponds to the desired amount of energy $E_{des}$. This will result in that the remaining amount of energy E' is cut off and not discharged by the flash device. Consequently, the emitted light from the flash device will have the color temperature $T_1$. According to the inherent relationships shown in FIG. 1B, a particular charging voltage V and a discharge interruption timing $t_1$ can be found such that the amount of energy provided to the flash device is $E_{des}$ and the color temperature $T_1$ is approximately the same as $T_{des}$, i.e. $T_1 \approx T_{des}$. Thus, in case of using a flash device, it is in this manner possible to provide a desired amount of energy $E_{des}$ to the flash device and still achieve the desired color temperature $T_{des}$ of the resulting emitted light, as shown by the arrow in FIG. 1A.

A second method of controlling the amount of energy provided to a flash device and the color temperature of the emitted light from the flash device is to have a set or bank of different capacitors, e.g. $C_1$-$C_3$, which are configured to provide energy to the flash device for the flash. This is illustrated in FIGS. 2A-2B. A given capacitor, e.g. $C_3$, of a particular capacitance being charged to a particular charging voltage $V_3$ corresponding to an energy level $E_3$ will generate a particular color temperature $T_{des}$ of the emitted light when provided to a flash device at a flash instance. Here, if a different amount of energy is desired to be provided to the flash device for the flash, while keeping the color temperature $T_{des}$ of the emitted light, any one of the different capacitors $C_1$-$C_3$ may be used separately or be combined to provide the desired amount of energy. However, since the number of capacitors sources $C_1$-$C_3$ in the set is finite due to the inherent implementation and economic considerations of having a large amount of capacitors, only finite number of discrete energy levels, e.g. $E_1, E_2, E_3, E_1+E_2, E_1+E_3, E_2+E_3, E_1+E_2+E_3$, will be possible for the desired color temperature $T_{des}$.

However, both of the methods described above suffer from disadvantages. For example, by using the first method described above in reference to FIGS. 1A-1B, the amount of energy $E_C$ has to be lowered in order for the flash device to get a desired color temperature. Another disadvantage with the first method is that the circuits used to interrupt the current cannot handle high currents.

Furthermore, achieving according to the second method a desired color temperature $T_{des}$ for a continuous, non-discrete range of energy levels E for even a flash device is not a scalable or cost efficient solution.

There is therefore a need for an improved solution for achieving a desired color temperature $T_{des}$, which solution solves or at least mitigates at least one of the above mentioned problems.

SUMMARY

It is understood by the inventor that it is highly desirable to provide a flash generator capable of providing a desired energy to a flash device and that the flash device also emits a desired color temperature during the flash.

This issue is addressed by a generator for a flash device. The generator comprises at least a first capacitor bank comprising at least one capacitor of a first type. The first capacitor bank being connectable to a charger via a first switch. The first capacitor bank being further connected to an output via a first component which only allows current flow from the first capacitor bank to the output. The generator further comprises at least a second capacitor bank comprising at least one capacitor of a second type connectable to the charger via a second switch. The second capacitor bank being further connected to the output via a second component which only allows current flow from the second capacitor bank to the output. The generator is configured to individually control the first switch and the second switch so that the first capacitor bank and the second capacitor bank can be individually charged to the same or different voltages. The generator further comprises a flash trigger switch connected to a trigger output for providing a trigger voltage to a flash device connectable to the generator.

Since the generator comprises a first capacitor bank with a first type of capacitors and the second capacitor bank comprises a second type of capacitors wherein the first capacitor bank and the second capacitor bank can be simultaneously discharged it is possible to achieve a desired energy level and color temperature from a flash device connected to the generator.

In one exemplary embodiment of the generator according to the present invention is the first type of capacitor a foil type capacitor and the second type of capacitor is an electrolytic type of capacitor. Different types of capacitors have different internal resistant. Foil type capacitors have low internal resistance compared to electrolytic type capacitors. Therefore the discharge of a foil type capacitor will go faster and generate a higher current density and a higher color temperature compared with electrolytic type capacitors. By mixing capacitors of different types, a first type in the first capacitor bank and a second type in the second capacitor bank, a desired flash energy and a desired color temperature can be achieved from a flash device connected to the generator.

This is a highly desirable feature of a flash device from a photographer's point of view since it enables a more predictable and reliable flash when taking a photograph.

Another advantage of the generator is that it provides the option to individually charge and discharge the first capacitor bank and the second capacitor bank individually. In an exemplary embodiment of the generator it is therefore possible to only charge and discharge the capacitor bank which comprises foil type capacitors. Since foil type capacitors has a lower internal resistance than electrolytic type capacitors a much shorter flash can be achieved if only the foiled type capacitors are used in the generator. This is an advantage if the photographer wants to for instance freeze a moving object.

Yet another advantage of the generator in an exemplary embodiment where it is possible to only charge and discharge the capacitor bank which comprises foil type capacitors, is that foil type capacitors has a longer life time than electrolytic type of capacitors. It is therefore possible achieve a longer life time of the generator if the capacitor bank with the foil type capacitors are used often.

A further advantage of the generator is that it provides a more options, since it allows a photographer to both achieve short flash duration only using the capacitor bank comprising foil type capacitors and a flash with higher energy and at the same time a desired color temperature.

According to another aspect of the invention, a method in a generator for a flash device is provided. The method comprising the step of: charging a first capacitor bank comprising capacitors of a first type with a charger in the generator connectable to the first capacitor bank via a first switch; charging a second capacitor bank comprising capacitors of a second type with the charger in the generator connected to the second capacitor bank via a second switch; discharging the first capacitor bank through an output via a first component which only allows current flow from the first capacitor bank to the output; discharging the second capacitor bank through the output via a second component which only allows current flow from the second capacitor bank to the output.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIG. 2A and 2B shows schematic graphs illustrating a second method of controlling the amount of energy provided to and the color temperature of the emitted light from a single flash device according to a prior art example.

DETAILED DESCRIPTION

Figure 1A:
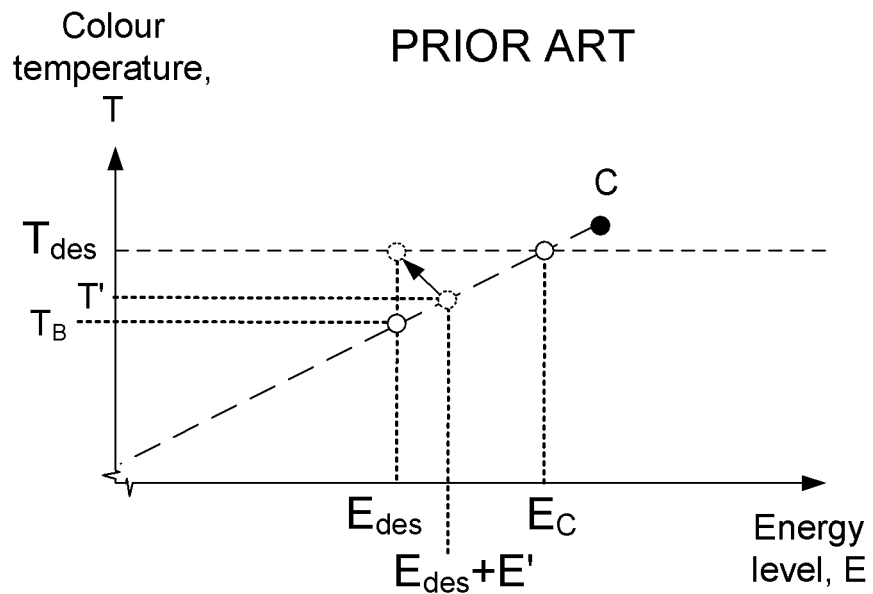
FIG. 1A and 1B shows schematic graphs illustrating a first method of controlling the amount of energy provided to and the color temperature of the emitted light from a single flash device according to a prior art example.
Figure 1B:
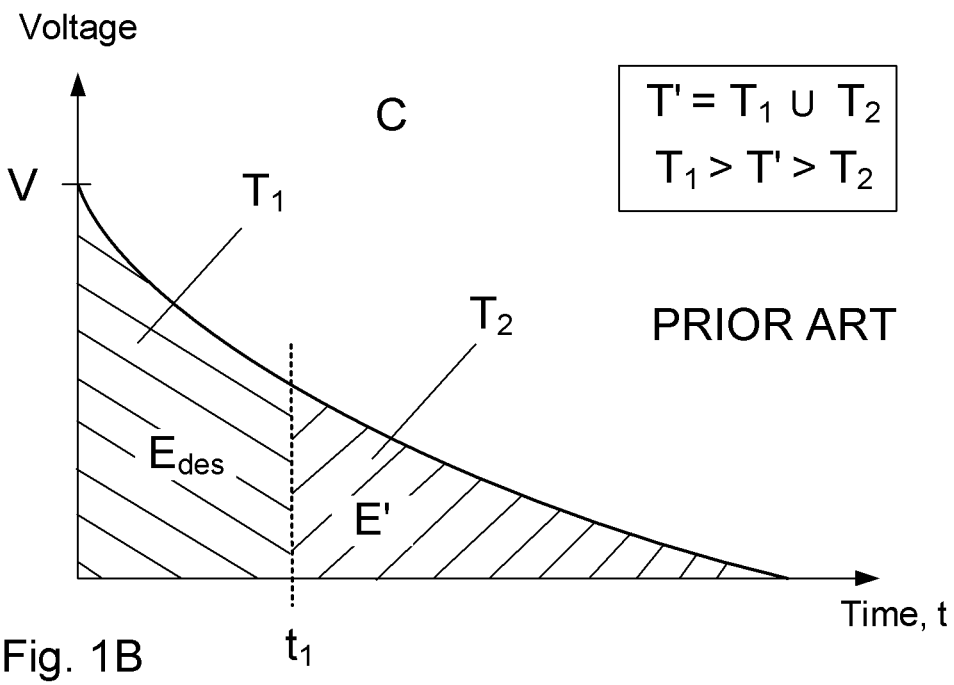

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 3:
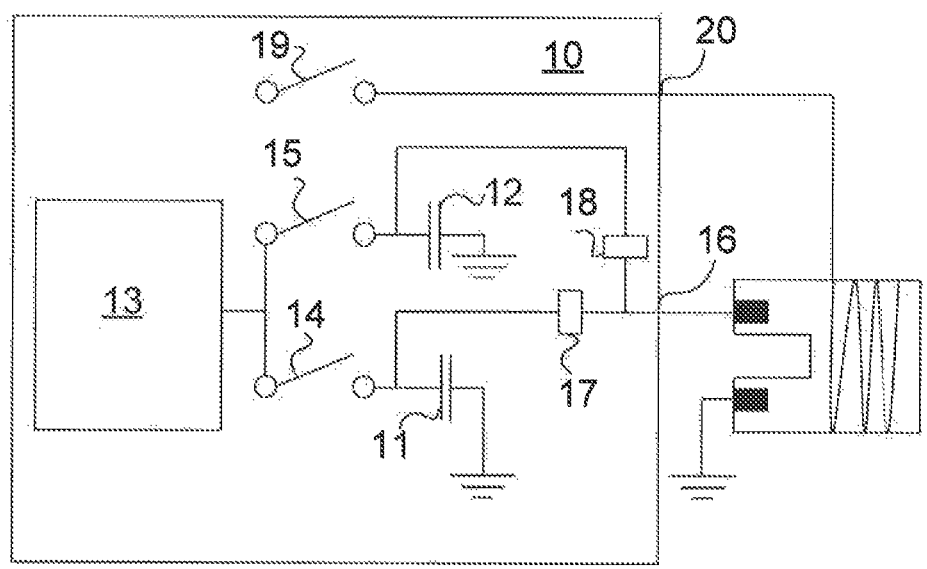
FIG. 3 illustrates a schematic block diagram of a flash generator according to an embodiment of the invention.

FIG. 3 illustrates a generator 10 for a flash device according to an exemplary embodiment of the present invention. The generator 10 may be any type of generator 10 intended to provide energy to a flash device connected to an output 16 of the generator 10. In order to be able to store energy which is used to generate a current to the flash device the generator 10 comprises at least a first capacitor bank 11 comprising at least one capacitor of a first type. The first type of capacitors may be of an electrolytic type capacitor or a foil type capacitor. The first type of capacitors may also be of other types. As will be described further down different types of capacitors have different discharge characteristics and internal resistance, therefore the current produced by the generator via the output 16 will be different depending on which type of capacitor that is used in the capacitor bank 11. The current produced by the generator 10 also depends on how large the capacitors in the capacitor bank 11 are. Another factor that influences the current produced by the generator 10 is the charge voltage of the capacitors in the capacitor banks 11.

The first capacitor bank 11 being connectable to a charger 13 via a first switch 14. The charger 13 charges the capacitors in the capacitor bank 11 via the first switch 14. In order to be able to deliver current from the generator 10 the first capacitor bank 11 being further connected to an output 16 via a first component 17 which only allows current flow from the first capacitor bank 11 to the output 16.

As mentioned above the generator 10 further comprises at least a second capacitor bank 12 comprising at least one capacitor of a second type connectable to the charger 13 via a second switch 15. The second type of capacitors may be of an electrolytic type capacitor or a foil type capacitor. The second type of capacitors may also be of other types. The second capacitor bank 12 being further connected to the output 16 via a second component 18 which only allows current flow from the second capacitor bank 12 to the output 16.

The generator 10 is configured to individually control the first switch 14 and the second switch 15 so that the first capacitor bank 11 and the second capacitor bank 12 can be individually charged to the same or different voltages. The generator may for instances comprise a microprocessor (not shown) configured to individually control the first switch 14 and the second switch 15.

The first switch 14 and the second switch 15 may be of many different types for instance a Triac or Thyristor In one exemplary embodiment of the generator 10 according to the present invention the generator 10 is further configured to control the first switch 14 and the second switch 15 so that the first capacitor bank 11 is charged to a first voltage and so that the second capacitor bank 12 is charged to a second voltage, wherein the first voltage is greater than said second voltage.

In this exemplary embodiment of the generator 10, the first switch 14 and the second switch 15 are first closed so that the charging of the first capacitor bank 11 and the second capacitor bank 12 start. After a certain amount of time is the first switch 14 opened. At this time the charge voltage of the first capacitor bank 11 and the second capacitor bank 12 have reached a certain voltage. Since the second switch 15 is still closed the charging of the second capacitor bank 12 still continues. After a while the second switch 15 is also opened. At this time the charge voltage of the second capacitor bank 12 has reached a higher voltage than the charge voltage of the first capacitor bank 11. Since the first switch 14 and the second switch 15 can be individually controlled by the generator 10 it is also possible to charge the first capacitor bank 11 to a higher voltage than the second capacitor bank 12.

A trigger output 20 is also provided on the generator 10. The trigger output 20 is intended to provide a trigger voltage to the flash device connected to the generator 10. A flash trigger switch 19 is connected to the trigger output 20 for providing the trigger voltage to the flash device at the correct timing. The flash trigger switches 19 is connected to the trigger output 20 and to a flash trigger (not shown) configured to provide the trigger voltage at a correct timing.

As mentioned above, in one exemplary embodiment of the generator 10 according to the present invention has the first capacitor bank 11 a first capacitance different from a second capacitance of the second capacitor bank 12.

Since the first capacitor bank 11 comprises a first type of capacitors and the second capacitor bank 12 comprises a second type of capacitors, the first capacitor bank 11 has a first discharge characteristic and the second capacitor bank 12 has a second discharge characteristic, wherein the first discharge characteristic is different from the second discharge characteristic.

The idea according to the present invention is that the first capacitor bank 11 comprises a first type of capacitors and the second capacitor bank 12 comprises a second type of capacitors. When the first type of capacitors and the second type of capacitors are simultaneously discharged through a flash device connected to the generator 10 a desired color temperature and flash energy is achieved.

As described above, in one exemplary embodiment of the generator 10 according to the present invention is the first type of capacitor a foil type capacitor and the second type of capacitor is an electrolytic type of capacitor. Different types of capacitors have different internal resistant. Foil capacitors have low internal resistance compared to electrolytic capacitors. Therefore the discharge of a foil capacitor will go faster and generate a higher current density and a higher color temperature compared with electrolytic capacitors. By mixing capacitors of different types, a first type in the first capacitor bank and a second type in the second capacitor bank, a desired flash energy and a desired color temperature can be achieved from a flash device connected to the generator.

In an exemplary embodiment of the generator 10 according to the present invention the first capacitor bank 11 comprises a capacitor of a first type which is a 150μ farad capacitor of foil type. In this exemplary embodiment the second capacitor bank comprises a capacitor of a second type which is a 600μ farad capacitor of electrolytic type. A goal for the generator 10 according to this exemplary embodiment may be to achieve a flash energy of 75 Ws (Watt second) and a color temperature of 5900K (Kelvin) from a flash device connected to the generator 10. In order to achieve this goal the first type of capacitor may be charged to 800 volts of energy and the second type of capacitor may be charged to 300 volt of energy. Charging the first type of capacitor to 740 volts result in that the first type of capacitor will hold the energy of 48 Ws. Charging the second type of capacitor to 300 volts result in that the second type of capacitor will hold the energy of 27 Ws. When the first type of capacitor and the second type of capacitors are discharged through a flash device connected to the generator 10, this will result in a flash with the energy 75 Ws and a color temperature of 5900K.

In order to illustrate the idea of the present invention an example of energy levels and color temperatures if the first type of capacitor and the second type of capacitors were discharged alone is also given. Discharging the first type of capacitor and the second type of capacitor separately at the same energy levels than if the first type of capacitor and the second type of capacitor were discharged simultaneously.

If the first type of capacitor which is a 150μ farad capacitor of foil type would be charged to 1000 volts and discharged alone through the flash device connected to the generator 10 this would result in a flash with the energy of 75 Ws and a color temperature of 6700K. If the second type of capacitor which is a 600μ farad capacitor of electrolytic type would be charged to 500 volts and discharged alone through the a flash device connected to the generator 10 this would result in a flash with the energy of 75 Ws and a color temperature of 5200K.

In yet another exemplary embodiment of the generator 10 according to the present invention the first component 17 and the second component 18 are diodes. In a further yet another exemplary embodiment of the generator 10 according to the present invention the first component 17 and the second component 18 are thyristors.

Figure 4:
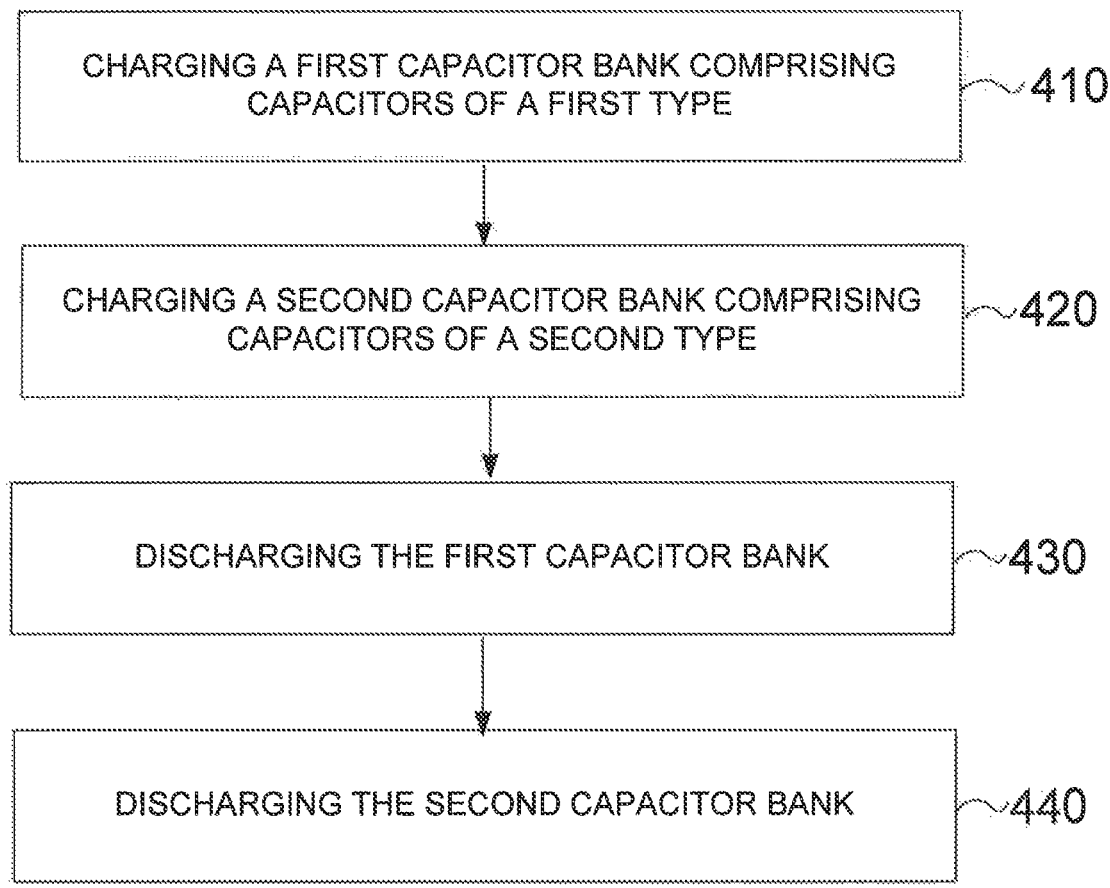
FIG. 4 illustrates a flow chart of a method according to an exemplary embodiment of the present invention.

FIG. 4 shows a flowchart illustrating a method in a generator 10 for a flash device according to previously described embodiments of the invention. The method comprises the steps of: charging 410 a first capacitor bank 11 comprising capacitors of a first type with a charger 13 in the generator 10 connectable to the first capacitor bank 11 via a first switch 14; charging 420 a second capacitor bank 12 comprising capacitors of a second type with the charger 13 in the generator 10 connected to the second capacitor bank 12 via a second switch 15; discharging 430 the first capacitor bank 11 through an output 16 via a first component 17 which only allows current flow from the first capacitor bank 11 to the output 16; discharging 440 the second capacitor bank 12 through the output 16 via a second component 18 which only allows current flow from the second capacitor bank 12 to the output 16.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

What is claimed is:

1. A generator for a flash device comprising:
   at least a first capacitor bank comprising at least one capacitor of a first type, said first capacitor bank being connectable to a charger via a first switch; said first capacitor bank being further connected to an output via a first component which only allows current flow from the first capacitor bank to the output;
   at least a second capacitor bank comprising at least one capacitor of a second type connectable to said charger via a second switch; said second capacitor bank being further connected to the output via a second component which only allows current flow from the second capacitor bank to the output;

wherein said generator is configured to individually control said first switch and said second switch so that said first capacitor bank and said second capacitor bank can be individually charged to the same or different voltages, wherein the first capacitor bank has a first discharge characteristics and the second capacitor bank has a second discharge characteristics, wherein the first discharge characteristics is different from the second discharge characteristics;

a flash trigger switch connected to a trigger output for providing a trigger voltage to a flash device connectable to the generator.

2. The generator according to claim 1, wherein said first capacitor bank has a first capacitance different from a second capacitance of the second capacitor bank.

3. The generator according to claim 1, wherein said first type of capacitors is of an electrolytic type capacitor and said second type of capacitor is a foil type capacitor.

4. The generator according to claim 1, wherein said first component and said second component are diodes.

5. The generator according to claim 1, wherein said first component and said second component are thyristors.

6. The generator according to claim 1, wherein said generator is further configured to control said first switch and said second switch so that said first capacitor bank is charged to a first voltage and so that said second capacitor bank is charged to a second voltage, wherein said first voltage is greater than said second voltage.

7. A method in a generator for a flash device, said method comprising the step of:

charging a first capacitor bank comprising capacitors of a first type with a charger in the generator connectable to the first capacitor bank via a first switch;

charging a second capacitor bank comprising capacitors of a second type with the charger in the generator connected to the second capacitor bank via a second switch;

discharging said first capacitor bank through an output via a first component which only allows current flow from the first capacitor bank to the output;

discharging said second capacitor bank through the output via a second component which only allows current flow from the second capacitor bank to the output; and wherein the first capacitor bank has a first discharge characteristics and the second capacitor bank has a second discharge characteristics, wherein the first discharge characteristics is different from the second discharge characteristics.

8. The method according to claim 7, wherein said first capacitor bank has a first capacitance and the second capacitor bank has a second capacitance, wherein said first capacitance is different from said second capacitance.

9. The method according to claim 7, wherein said first type of capacitor is an electrolytic type capacitor and said second type of capacitor is a foil type capacitor.

10. The method according to claim 7, wherein said first component and said second component are diodes.

11. The method according to claim 7, wherein said first component and said second component are thyristors.

12. The method according to claim 7, wherein said steps of charging further comprising charging said first capacitor bank to a first voltage and said second capacitor bank to a second voltage, wherein said first voltage is greater than said second voltage.

13. The method according to claim 7, wherein said steps of charging further comprising charging said first capacitor bank to a first voltage and said second capacitor bank to a second voltage, wherein said first voltage is less than said second voltage.

* * * * *